H. A. PALMER.
CASTER.
APPLICATION FILED DEC. 13, 1911.
1,023,222.
Patented Apr. 16, 1912.
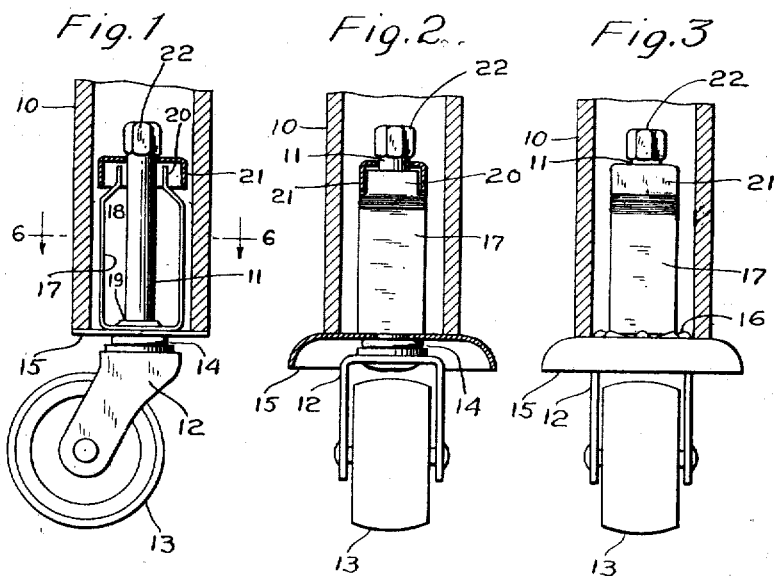
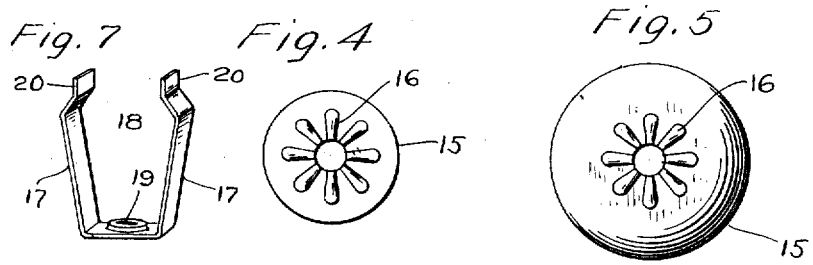
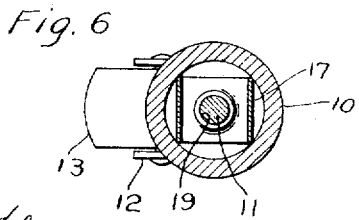
WITNESSES:
H. W. Meade
S. W. Atherton.
INVENTOR
Harry A. Palmer
BY
A. M. Wooster
ATTORNEY

UNITED STATES PATENT OFFICE.

HARRY A. PALMER, OF MERIDEN, CONNECTICUT, ASSIGNOR TO FOSTER, MERRIAM AND COMPANY, OF MERIDEN, CONNECTICUT, A CORPORATION OF CONNECTICUT.

CASTER.

1,023,222.

Specification of Letters Patent. Patented Apr. 16, 1912.

Application filed December 13, 1911. Serial No. 665,519.

*To all whom it may concern:*

Be it known that I, HARRY A. PALMER, a citizen of the United States, residing at Meriden, county of New Haven, State of Connecticut, have invented an Improvement in Casters, of which the following is a specification.

This invention has for its object to provide a simple and inexpensive caster adapted for general use and especially adapted for use in connection with metal furniture legs, which shall be self-retaining in place by spring pressure and will be held in the leg against lateral movement at both bottom and top, thereby doing away with the necessity for a cupped washer to retain the caster in place.

With these and other objects in view I have devised the simple and novel caster which I will now describe, referring to the accompanying drawing forming a part of this specification and using reference characters to indicate the several parts.

Figure 1 is an elevation of my novel caster as in use, the furniture leg being shown in section and the washer flat and of even diameter with the leg; Fig. 2 an elevation as seen from the left in Fig. 1 and showing an enlarged downwardly curved washer in section; Fig. 3 a similar view, the washer being in elevation and provided with rounded corrugations; Figs. 4 and 5 are plan views of different types of washers provided with rounded corrugations; Fig. 6 a section on the line 6—6 in Fig. 1, looking in the direction of the arrows; and Fig. 7 is a perspective of the spring yoke detached.

10 denotes a furniture leg which may be tubular or provided with a central opening, 11 the caster pintle, 12 the horn and 13 the wheel which may be of any suitable material as metal, wood, glass, felt or rubber. The horn may be of any ordinary or preferred construction and may be either cast or made of sheet metal. The lower end of the pintle is riveted or otherwise rigidly secured to the horn. Above the yoke is a bearing 14 which may be formed in any suitable manner as by one or more washers or by upsetting the metal of the pintle. A washer 15 rests upon this bearing and turns freely on the pintle. For ordinary low priced casters it is sufficient to use a flat washer of the same diameter as the furniture leg, as in Fig. 1. When a better finish for the leg is desired I use an inverted concavo-convex washer which is made large enough to extend outward from the leg and to conceal the top of the horn. Either type of washer may or may not be provided with rounded corrugations 16, as in Figs. 3, 4 and 5.

The essentially novel feature of the invention is a pair of spring arms indicated by 17 which engage the inner periphery of the furniture leg. These spring arms are preferably made in the form of a spring yoke, indicated by 18, from a continuous strip of metal having a hole 19 at the center of the base through which the pintle passes freely, the yoke resting upon the washer. The central portion of the strip comprises the base of the yoke and the spring arms are bent upward from the ends thereof. The upper ends of the arms, when free, spring outward from the base, as shown in Fig. 6, so as to provide ample spring pressure, when they are pressed inward, to retain the caster in place in a furniture leg. The spring yoke is so proportioned that the edges of the lower ends of the spring arms just enter the furniture leg freely, the purpose of which is to provide a continuous engagement of the spring arms with the inner periphery of the leg or an engagement of the spring arms with the leg at separated points, it being important that the spring arms engage the inner periphery of the yoke at separated points or else continuously so as to prevent lateral motion of the caster as a whole and insure a firm hold of the spring yoke upon the inner periphery of the leg. The upper ends of the spring arms are bent inward and then upward, as at 20, and said ends are retained within a cap indicated by 21, said cap being loosely retained on the pintle by a head 22 which may be formed by upsetting the end of the pintle. The cap is inexpensively formed, ordinarily by blanking out and forming from sheet metal. Its use is to limit the outward movement of the spring arms when the caster is detached.

The operation will be obvious from the drawing. The caster is attached or removed by a single movement and is self-retaining in place, the spring arms of the yoke yielding when the yoke is inserted in the leg and the edges of the spring arms engaging the inner periphery of the leg, thereby holding the caster as a whole against lateral movement at both top and bottom. The entire weight carried by the caster is supported by the washer. Owing to the fact that lateral movement of the caster is wholly prevented by the spring yoke, cupped washers to retain the casters in place are dispensed with, a flat washer the diameter of the furniture leg being all that is required although ornamental forms may be used if preferred, as in Figs. 2 and 3.

Having thus described my invention I claim:

1. In a caster, the combination with a pintle, horn and washer, of spring arms loosely connected to the lower end of the pintle and extending upward, and a cap carried by the pintle for limiting the outward movement of the spring arms when the caster is detached.

2. In a caster, the combination with a pintle, horn and washer, of spring arms loosely connected to the lower end of the pintle and extending upward, the upper ends of said arms being bent inward and then upward and a cap loosely engaging the pintle and acting to limit the outward movement of the spring arms when the caster is detached.

In testimony whereof I affix my signature in presence of two witnesses

HARRY A. PALMER.

Witnesses:
BLAINE COGGINS,
CHAS. S. TRILEAX.